United States Patent [19]

Brown et al.

[11] Patent Number: 5,051,982
[45] Date of Patent: Sep. 24, 1991

[54] METHODS AND APPARATUS FOR IMPLEMENTING SWITCHED VIRTUAL CONNECTIONS (SVCS) IN A DIGITAL COMMUNICATIONS SWITCHING SYSTEM

[75] Inventors: David K. Brown, Lewisville; Richard L. Christensen, Richardson, both of Tex.

[73] Assignee: Data General Corporation, Westboro, Mass.

[21] Appl. No.: 385,902

[22] Filed: Jul. 27, 1989

[51] Int. Cl.5 .................... H04Q 11/04; H04J 3/12
[52] U.S. Cl. ................................ 370/58.2; 370/110.1
[58] Field of Search ................ 370/58.1, 58.2, 60.1, 370/60, 94.1, 110.1; 379/221; 340/825.79

[56] References Cited

U.S. PATENT DOCUMENTS

| | | | |
|---|---|---|---|
| 4,088,845 | 5/1978 | Lalanne et al. | 340/825.79 X |
| 4,805,166 | 2/1989 | Ardon et al. | 370/58.1 X |
| 4,878,216 | 10/1989 | Yonoki | 370/110.1 |
| 4,907,220 | 3/1990 | Rau et al. | 370/94.1 |

Primary Examiner—Douglas W. Olms
Assistant Examiner—H. Kizou
Attorney, Agent, or Firm—Joseph J. Kaliko; Jacob Frank; Joel Wall

[57] ABSTRACT

Methods and apparatus are set forth for quickly making switched virtual connections (SVCs) in a digital circuit switch that integrates voice and data using common switch, control and distribution equipment. SVCs provide concurrent data connection service from one station device, such as a PC, to other station devices over a single line for each station device where the line may also carry voice and terminal data service. A switch control processor remembers connection requests from station devices and acts on opportunities to utilize available bandwidth in an optimal manner. Dynamic connection reconfiguration techniques allow the system to "scavenge" bandwidth unused by voice or terminal data traffic for SVCs thereby providing the largest possible data rate at any given time. Short signalling messages and indexed values are used in order to speed activation time for previously defined connections while resource allocation is performed by the switch control processor to further enhance system operating speed. The system features (a) reduced connection set up time compared with prior art circuit switch communications systems that need to establish a call each time frames are exchanged; (b) the elimination of expensive concentrators (for example, packet switches); (c) a broadcast channel; (d) enhanced traffic analysis capabilities; and (e) the communication security inherent in circuit switch architectures.

19 Claims, 9 Drawing Sheets

SWITCHED VIRTUAL CONNECTION
HIGH LEVEL HARDWARE
BLOCK DIAGRAM

SWITCHED VIRTUAL CONNECTION HIGH LEVEL HARDWARE BLOCK DIAGRAM

FIG. 5

STATE 1: INITIALIZED

| INPUT EVENT(S) | PROCESS | OUTPUT EVENT(S) | FINAL STATE |
|---|---|---|---|
| DEV_TYPE | SET-UP DATA STRUCTURES AND SEND NETWORK DEPENDENT INFORMATION TO THE PIM | INIT_IND ADDR_DEF BDCST_ADDR (SET_IDLE) (SET_NO_DATA) READY | 2 |

FIG. 6

STATE 2: IN-SERVICE

| INPUT EVENT(S) | PROCESS | OUTPUT EVENT(S) | FINAL STATE |
|---|---|---|---|
| FROM IOC CTLR: PIM_RESET OR RESET_REQ | CLEAR ALL CONNECTIONS | PIM_RESET | 1 |
| FROM LAYER OR NET MGMT FUNC: MAINT_MODE_REQ | ALL CONNECTIONS ARE PAUSED WHILE IN MAINTENANCE MODE | SET_MAINT_MODE | 3 |
| ANY OTHER CMDS FROM IOC OR PIM's | PROCESS SVC ACTIVITIES | REFER TO SVC OPERATION DOCUMENTATION | 2 |

FIG. 7

STATE 3: MAINTENANCE

| INPUT EVENT(S) | PROCESS | OUTPUT EVENT(S) | FINAL STATE |
|---|---|---|---|
| FROM LAYER OR NET MGMT FUNCT: MAINTENANCE CONTROL CMDS | PERFORM REQUIRED OPERATIONS, INTERACT WITH PIM's AS NEEDED | REFER TO MAINTENANCE MODE DOCUMENTATION | 3 |
| RESET_REQ FROM IOC CTRL | CLEAR ALL STRUCTURES AND STATUS INFORMATION | PIM_RESET | 1 |
| FROM LAYER OR NET MGMT FUNC: CLR_MAINT_REQ | CLEAN UP STATUS OF ALL PENDING MAINTENANCE ACTIVITY | CLR_MAINT_MODE | 2 |

FIG. 8

STATE 1: CONNECTION IS UNUSED (IDLE)

| INPUT EVENT(S) | PROCESS | OUTPUT EVENT(S) | FINAL STATE |
|---|---|---|---|
| CON_REQ | VERIFY THAT REQUEST IS VALID, CONFIRM ESTABLISHMENT | EST_CONF | 2 |
| ANY OTHER MSG | RECORD ERROR | PROTO_ERR | 1 |

FIG. 9

STATE 2: CONNECTION READY AND IDLE (IDLE)

| INPUT EVENT(S) | PROCESS | OUTPUT EVENT(S) | FINAL STATE |
|---|---|---|---|
| REL_REQ | RELEASE ANY RESOURCES IN THE IOC RESERVED FOR THIS CONNECTION | REL_CONF | 1 |
| BID | IF REQUESTED DESTINATION IS AVAILABLE AND CONFIGS MATCH, SET UP PATH | TO SOURCE: GRANT | 4 |
| | IF THERE ARE NO FREE DESTINATION CHANNELS IN THE RIGHT CONFIGURATION, BEGIN THE DESTINATION ACQUISITION PROCESS | NOTHING | 3 |
| ANY OTHER MSG | RECORD ERROR | PROTO_ERR | 1 |

FIG. 10

STATE 3: BID PENDING (BID_PENDING)

| INPUT EVENT(S) | PROCESS | OUTPUT EVENT(S) | FINAL STATE |
|---|---|---|---|
| FROM IOC CTRL: MATRIX READY | RECORD SUPER CHANNEL, DEQUEUE BID, START TIMER | GRANT | 4 |
| FROM IOC CTRL: DESTINATION NOT AVAILABLE (TIME_OUT) | REMOVE THE BID FROM THE QUEUE | DEST_TO | 2 |

FIG. 11

STATE 4: CONNECTION ACTIVE

| INPUT EVENT(S) | PROCESS | OUTPUT EVENT(S) | FINAL STATE |
|---|---|---|---|
| PAUSE | RELEASE CONNECTION THROUGH MATRIX, QUEUES A BID FOR THIS CONNECTION | NOTHING | 3 |
| DROP | RELEASE CONNECTION THROUGH MATRIX | NOTHING | 2 |
| TIMER RESET REQ FROM CM | GENERATE MESSAGE | T_RESET | 4 |
| A HOLD | GENERATE MESSAGE | YIELD | 4 |

FIG. 12

STATE 1: SUPER CHANNEL CONFIGURATION CONFIRMED

| INPUT EVENT(S) | PROCESS | OUTPUT EVENT(S) | FINAL STATE |
|---|---|---|---|
| FROM IOC CTRL: SRC_GROUP_REQ OR DEST_GROUP_REQ | PEND CONFIGURATION WAIT FOR CONFIRMATION | SRC_CFG OR DEST_CFG | 2 |
| FROM IOC CTRL: CFG_RESET_REQ OR FROM PIM CFG_RESET | PREPARE ALL SUPER CHANNELS TO BE SET TO AN EMPTY CONFIGURATION | CFG_RESET | 3 |

FIG. 13

STATE 2: SUPER CHANNEL CONFIGURATION PENDING

| INPUT EVENT(S) | PROCESS | OUTPUT EVENT(S) | FINAL STATE |
|---|---|---|---|
| S_CFG_CONF OR D_CFG_CONF | MODIFY THE MATRIX CONFIGURATION TO CONNECT THE NEW PATTERN | NOTHING | 1 |
| FROM IOC CTRL: CFG_RESET_REQ OR FROM PIM CFG_RESET | PREPARE ALL SUPER CHANNELS TO BE SET TO AN EMPTY CONFIGURATION | CFG_RESET | 3 |

FIG. 14

STATE 3: CHANNEL CONFIGURATION RESET PENDING

| INPUT EVENT(S) | PROCESS | OUTPUT EVENT(S) | FINAL STATE |
|---|---|---|---|
| FROM PIM: CFG_RESET | SET SUPER CHANNELS TO AN EMPTY CONFIGURATION | CFG_RESET | 1 |

METHODS AND APPARATUS FOR IMPLEMENTING SWITCHED VIRTUAL CONNECTIONS (SVCS) IN A DIGITAL COMMUNICATIONS SWITCHING SYSTEM

BACKGROUND OF THE INVENTION

1. Field of the Invention

The invention relates generally to digital communications switching systems (sometimes referred to hereinafter as networks) that are circuit switch based, and to methods and apparatus for managing bandwidth allocation in such systems. More particularly, the invention relates to methods and apparatus that can be used to define, activate and manage virtual connections between network station devices, such as host computing resources, PCs, etc. These virtual connections are defined once, then they can be recalled and activated (i.e., be "switched on") as network resources are actually needed and become available. The resulting communication paths through the switching network, the "switched virtual connections" (SVCs), can be dynamically reconfigured depending on traffic conditions including data volume, channel availability, etc., thereby facilitating effective bandwidth management and other features.

2. Description of the Related Art

Communication systems are known which have the ability to integrate voice, terminal data and control communications throughout the system network. One such system is described in U.S. Pat. No. 4,612,634 issued Sept. 16, 1986 to John Bellamy, entitled "Integrated Digital Network". The U.S. Pat. No. 4,612,634 patent is assigned to the same assignee as the present invention and is referred to hereinafter as the "IDN". U.S. Pat. No. 4,612,634 is hereby incorporated by reference.

The IDN is a digital circuit switch that may be characterized in that it has the ability to integrate voice and data using common switching, control and distribution equipment.

More particularly the IDN taught in the referenced application includes a matrix switch and a plurality of user ports for exchanging voice, data and control digital signals between the matrix switch and user equipment. Digital switching and multiplexing techniques are used in the IDN system to provide simultaneous voice and data service at peripheral user ports into the system. Voice is PCM encoded onto a 64 kbps "bearer" channel at the station instrument. Each data stream uses an appropriate scheme to encode its output onto the same type of bearer channel as a PCM voice stream. Out-of-band signalling channels of various bit rates are used from the stations throughout the system.

The IDN includes a transmission system of bearer channels and a parallel control system of signalling channels. It uses a hierarchal channelization scheme which multiplexes all of the bearer and signalling channels into multiple 64 kbps subchannels which are carried over higher speed links to terminate on matrix ports at the matrix switch. The matrix switch interconnects the bearer channels of the transmission system and provides matrix signal ports to present signalling channels of the control system to the switch controller. In the preferred embodiment the IDN channels are combined by concentration units such that all interconnection with the central equipment is via 2.048 Mbps links. In addition, there are subsequent intermediate links between the concentrators and station devices which carry traffic at 256 kbps and 80 kpbs. A 2.048 Mbps link is hereinafter referred to as a GL-5 link, a 256 kbps link is hereinafter referred to as a GL-2 link and an 80 kbps is hereinafter referred to as a GL-0 link.

The user ports of the IDN provide access to station bearer and signalling channels. The transmission system includes, among other components, a plurality of station multiplex/demultiplex circuits (referred to hereinafter as "SMXs") servicing a cluster of user ports, for concentrating the digital signal samples from each port (which include both bearer and signalling channels) into channel signals for exchange with the matrix switch.

All bearer information carried by the IDN, e.g., voice, data and signal information, are switched through the matrix for transmission through the system. This allows for flexibility in configuring IDN information paths. Also, multiple levels of multiplexing are used to combine station port signals into higher order multiplex signals for transmission to the IDN matrix. This occurs remotely from the central matrix and is flexible, allowing for selected installation of any number of station ports where needed.

The remote multiplexing for the IDN is performed by Channel Multiplexers ("CMXs") which form an integral part of the IDN system as depicted in FIG. 1 of the incorporated patent. The figure shows CMXs being utilized as part of line and trunk interface (units 117 and 140 respectively), and further shows the CMXs in close physical proximity to and tightly physically coupled (via a shared backplane) to the Central Equipment Module (CEM).

Another circuit switch based communication system, which improves upon the IDN, is described in copending U.S. patent application, Ser. No. 07/372,885, filed June 28, 1989 entitled "Integrated Office Controller (IOC)", also assigned to the same assignee as the present invention.

The IOC, like the IDN, is a digital PCM information handling system for voice, and simultaneous handling of data signal communication between stations serviced by IOC station multiplexers.

The IOC network includes, in combination, a plurality of station devices, capable of transmitting and receiving multiplexed bearer and signal channel information; user port interface means for carrying said multiplexed bearer and signal channel information between a station device and a station multiplex/demultiplex device (SMX); a plurality of station multiplex/demultiplex devices (SMXs) each associated with and coupled to a predefined cluster of said station devices, via said user port interface means, for concentrating the multiplexed bearer and signal channel information, transmitted from said user port interface means toward said switch matrix, into channel signals, and for demultiplexing channel signals being transmitted toward the cluster of station devices coupled to a given SMX into multiplexed bearer and signal channel information for distribution to said station devices; transmission system means, capable of interfacing SMXs and trunk cards to a CEM, where SMX/CEM interfacing is performed by a Line Interface Module (LIM), and trunk/CEM interfacing is performed by a Trunk Interface Module (TIM); call processor, system clock means and matrix switch means, located in the CEM device, for switching said channel signals; and host processing means, coupled to the CEM, for providing support for programmable applications that include voice and data integration within the IOC network.

Reduced wiring and equipment cost, configuration flexibility and expansion possibilities are realized in the IOC (when compared to IDN) via the provision for modular LIMs and TIMs in the IOC system. Further cost reduction in LIM and TIM equipment (and transmission equipment generally) are realized by concentrating switch intelligence (call processing functions, feature cards, etc.) at the CEM level.

The IOC includes additional processing resources (when compared to the IDN) which provide simplified device access, station installation, call handling and PC integration, along with improved voice mail and electronic office capabilities.

Both the IDN and IOC as described in the incorporated references exemplify state of the art circuit switches that require definition and activation of duplex communication paths each time a given station device on the network wants to establish a connection to another station device on the network. Additionally, prior art integrated digital circuit switch networks of the type described in the incorporated references, require full period connections (FPCs) for all data paths (voice and data) through the network, where an FPC is defined as a connection that is active from the beginning to the end of a call even if there is no useful information being carried in the channel during some periods of the call.

A great deal of network overhead, i.e., network resource (controller, memory, bandwidth, etc.) utilization, is expended by repeatedly defining and activating the aforementioned paths. This overhead expense is presently necessary since no protocol exists in systems typified by the references for providing quick access between station devices through the matrix. Network resources are further wasted by utilizing full duplex connections and FPC protocols in situations not requiring these features. For example, a simplex, non-FPC path may be all that is required to allow a first computer coupled to the network to transmit a block of data to a second computer.

In addition to the aforementioned shortcomings pertaining to network overhead, known circuit switch based communications systems of the types described in the incorporated references do not have the broadcast capability typically found in packet switch or local area network (LAN) architectures. Such capability allows one device on the network to transmit data to two or more (or all) of the station devices attached to the network at the same time.

Well known LANs and packet switches, such as the LAN specified in the IEEE 802.3 specification and the packet switch described in the CCITT X.25 recommendations, provide both broadcast and quick switch access capabilities (i.e., eliminate the need for repeated call definition and establishment, etc.); however, the known systems with these capabilities are not circuit switches and are not capable of integrating voice and data using common equipment like the IDN and IOC.

Accordingly, it would be desirable to implement the aforementioned LAN and packet switch features (i.e. broadcast and quick access between devices) in a digital circuit switch environment (like the IOC) where common switch, control and distribution equipment are used for voice and data. Furthermore, it would be desirable to be able to implement these features using the existing switching, control and distribution hardware found in a circuit switch without having to, for example, expend data buffering overhead and centralized packet switching computer hardware to perform these functions.

Further yet, it would be desirable to be able to perform dynamic resource allocation and traffic analysis in the aforementioned circuit switch based systems so that maximum utilization of available bandwidth can be achieved while at the same time reducing network overhead.

Still further desirable circuit switch features include (a) providing the LAN and packet switch type broadcast feature without compromising the security inherent in circuit switch type communications and (b) controlling the fairness of access to data communication channels by all stations on the network, while at the same time providing quick access between station devices connected to the network.

SUMMARY OF THE INVENTION

It is an object of the invention to facilitate communication (a) from one network station device to one of many other network station devices and (b) from one network station device to many other network station devices simultaneously, utilizing the existing switching, control and distribution equipment found in a digital circuit switch that uses common equipment to integrate voice and data.

It is a further object of the invention to reduce the overhead expended on call setup, duplex connections and FPCs in state of the art data circuit switches capable of integrating voice and data using common equipment.

Further yet, it is an object of the invention to maximize the utilization of available bandwidth and minimize the use of network resources by automatically allocating as much bandwidth as is required (and available) to establish an active communication path through the circuit switch.

Further objects of the invention include the ability to perform dynamic reconfiguration of channels used by a connection and the ability to perform resource utilization timing to control the fairness of access to communication channels by all station devices.

According to the invention, methods and apparatus are set forth for quickly making switched virtual connections (SVCs) in a digital circuit switch that integrates voice and data using common switch, control and distribution equipment. SVCs provide concurrent data connection service from one station device, such as a PC, to other station devices over a single line for each station device where the line may also carry voice and terminal data service.

Furthermore, according to the invention, a switch control processor (also sometime referred to as a matrix controller, switch controller, switch intelligence, etc.) remembers connection requests from station devices and acts on opportunities to utilize available bandwidth in an optimal manner. Use of dynamic connection reconfiguration techniques, performed at the switch level, allows the system to "scavenge" bandwidth unused by voice or terminal data traffic for SVCs thereby providing the largest possible data rate at any given time.

The preferred embodiment of the invention includes methods and apparatus for registering each station device on the network, and for defining and activating connections requested by a given station device via a bidirectional signalling path. This signalling path is independent of other connection or signalling paths, such as those used for voice and data terminal service. The novel system uses short messages and indexed values in order to speed activation time for previously defined connections. Resource allocation is performed by the switch control processor in order to further enhance the operating speed of the system.

To insure the fairness of access to data communication channels, the invention utilizes a timer based scheme for granting resources with the timer being situated at the station device level. The timer can be accessed by the switch control processor to allow implementation of prioritization protocols, runaway protection schemes, etc. Network traffic control is performed, at least in part, at the station device level to conserve switching resources.

The system features (a) reduced connection set up time compared with prior art circuit switch communications systems that need to establish a call each time frames are exchanged; (b) the elimination of expensive concentrators (for example, packet switches) since the invention facilitates direct device to device communication at high speeds; (c) a broadcast channel which allows a station device to simultaneously transmit data to a set of devices on the network in a broadcast mode; (d) enhanced traffic analysis capabilities since connection set up is handled by a central mechanism (the switch control processor) and; (e) the communication security inherent in circuit switch architectures.

These and other objects and features of the present invention will be understood by those of ordinary skill in the art after referring to the detailed description of the preferred embodiment of the invention and the appended drawing.

BRIEF DESCRIPTION OF THE DRAWING

FIGS. 5-14 set forth an example of SVC state machine models which describe the details of SVC operation in terms of the state of an individual connection as perceived from within the switch control processor.

DETAILED DESCRIPTION

Figure 1:
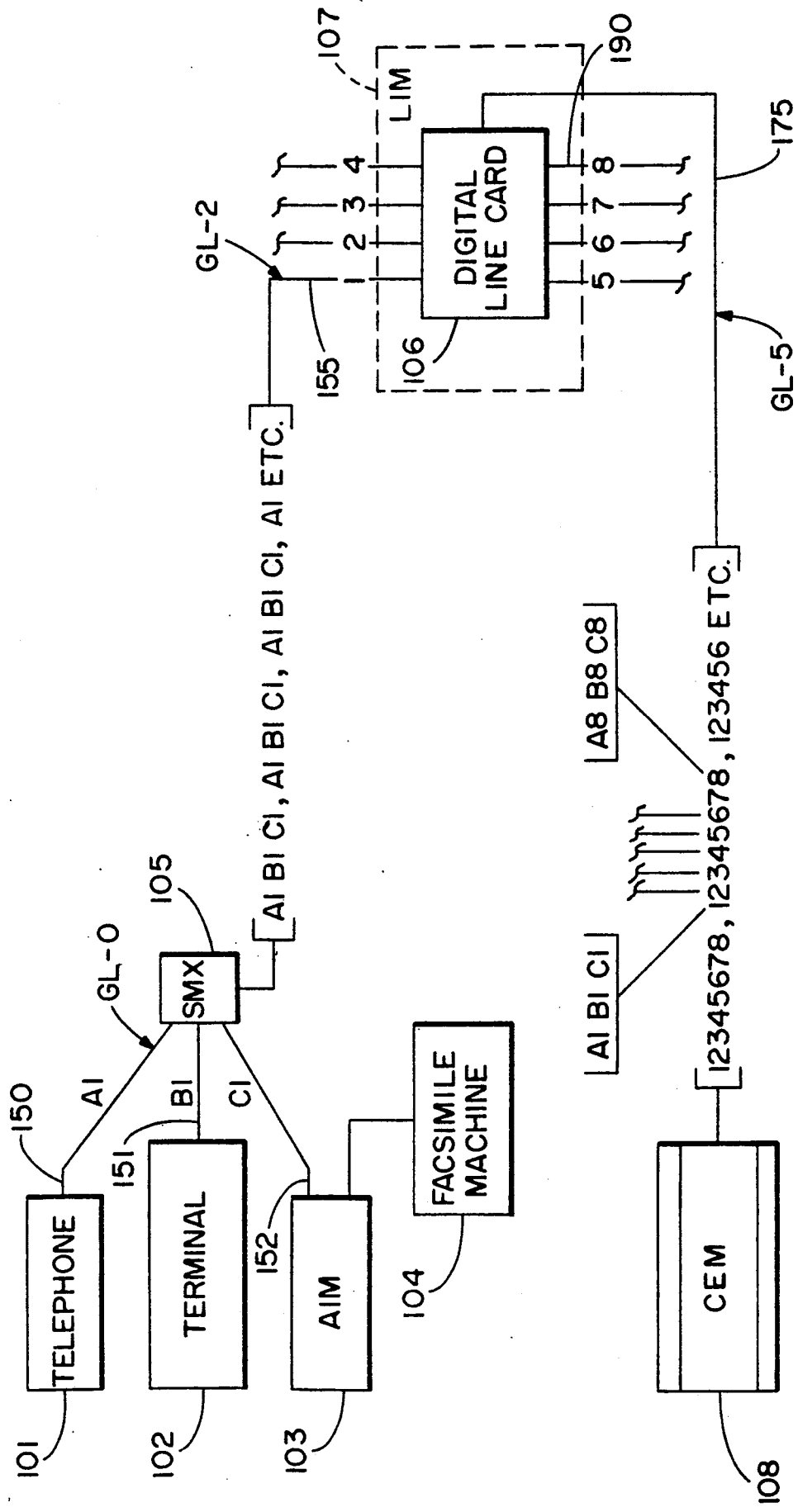
FIG. 1 depicts an example of how multiplexing can be implemented in a circuit switch based digital communication system like the IOC, utilizing GL-0, GL-2 and GL-5 links.

The present invention will, for the sake of illustration only, be described in the context of the IOC, the details of which are set forth in the previously incorporated copending patent application. Those skilled in the art will recognize that SVCs can be made and would be useful in other circuit switch based architectures, e.g., the IDN, without departing from the spirit or scope of the invention.

The circuit switch based IOC is comprised of three types of hardware components: (1) station equipment; (2) an integrated office switching system (IOSS); and (3) a host computing resource.

Station equipment includes, for example data terminals, digital telephone sets, PCs, and analog telephone interface equipment.

The IOSS portion of the IOC, as taught in the incorporated copending application, includes three basic modules: (1) a central equipment module (CEM), including the actual circuit switch, (2) at least one line interface module (LIM) and (3) at least one trunk interface module (TIM).

An understanding of each of the above referenced hardware groups and modules (except for the TIM which is not needed to explain the present invention) will be useful in understanding how SVCs are defined and used. Accordingly, this subject matter will be reviewed first and be followed by the details of registering, defining, activating and managing SVCs between certain types of station devices in the IOC. This latter description will fully illustrate the principles of the invention.

It is important to note that the preferred embodiment of the IOC as set forth in the referenced application, has two types of computer interface cards; a processor interface module (PIM) for interfacing the IOSS with a host computer resource. A PC interface module (PIM-PC) is used for interfacing the IOSS with PC stations. These modules allow both synchronous and asynchronous communication between processors (PCs or host computers) and other IOC components. The interface modules convert the signal format on the data links (to be described hereinafter) connected to a given processor, into processor compatible signals (and vice versa since the interface is bidirectional). Speed buffering is also performed to match processor bus characteritics. Once the data link signal format and processor type is known, the conversion process is well within the knowledge of those skilled in the art and does not constitute a part of the invention per se. An example of a commercially available PIM is the Data General 4621 (PIM-E) and a commercially available PIM-PC is the Data General 4617.

The host resources could, for example, be any one of a number of computing resources such as Data General ECLIPSE MV/Family Computer, computers using Motorola's 88000 chip set, etc. The type of host resource used does not limit the scope of the present invention.

The host resource, which can be accessed by a low cost multiplexed interface (for example the GL-5 interface referred to herein) allows for user programming and performing a number of well known call management, electronic office and integrated voice and voice mail services.

Fundamental to the understanding of the present invention is an explanation of the different types of digital transmission links that can be (and are) used within a system like the IOC. The three types of links described in the referenced IOC application (previously mentioned herein) are the GL-0 link, the GL-2 link and the GL-5 link.

The GL-0 link couples station equipment to a Station Multiplexer (SMX) which services a cluster of up to three stations. Each GL-0 link provides a station port with an 80 kbps full duplex data transmission link. Two twisted pairs of wire (standard telephone wiring) may be used to transmit the bit stream, with the power needed to operate the station equipment imposed on the signal.

The bit stream may be formatted according to well known practice (as taught in the IOC application, the IDN patent and elsewhere) as follows: (1) an 8 kbps signalling channel, referred to hereinafter as the "C channel" or C bit; (2) a 64 kbps bearer channel for user selectable voice or data; and (3) an 8 kbps "E channel" or E bit, meaning "extra", auxiliary data or signalling channel. It will be seen hereinafter that the E channel is utilized by the preferred embodiment of the invention for SVC signalling.

The 64 kbps bearer channel carries digitized voice when connected, e.g. to telephone equipment, or data, when e.g. connected to a data terminal. The 8 kbps C channel carries event messages and commands such as: Off-Hook, On-Hook, Key Depressions, Ring, Turn on a Lamp, Raise Carrier Detect, etc.

The second type of link in the IOC hierarchy is the aforementioned GL-2 link. A GL-2 link is a 256 kbps full-duplex data transmission link that also uses 2 twisted-wire pairs. Each pair is used for transmission in one direction. The GL-2 may be used to connect LIMs and SMXs where, as indicated hereinbefore, each SMX is connected to station equipment.

According to the preferred embodiment of the invention, the GL-2 bit stream is formatted as follows: (1) an 8 kbps framing channel, also referred to hereinafter as "F channel" or F bit; (2) an 8 kbps "X channel" X bit (an auxiliary channel); and (3) three 80 kbps data streams. The three 80 kbps data streams correspond to the three GL-0 streams. The X channel will be seen hereinafter to be useful in implementing an SVC broadcast capability.

The GL-2 may also be transmitted directly to a PIM-PC board associated, for example, with an IBM-compatible PC. The PIM-PC can use up to 192 kbps of the 256 kbps for data transmission (both voice and text).

Finally, the third type of link in the IOC hierarchy is the aforementioned GL-5 link. The GL-5 link is a 2.048 mbps full-duplex data transmission link that uses 2 twisted-wire pairs. Each pair is used for transmission in one direction. GL-5s connect a CEM to other system components, e.g. to the host computing resource.

The GL-5 bit stream is formatted as follows: (1) thirty-one 64 kbps bearer channels; and (2) one 64 kbps framing channel which identifies the other 31 channels.

The 31 data streams can have different functions for different applications. According to the preferred embodiment of the IOC taught in the referenced application, when connected to a LIM or a TIM, 24 of the data channels are used as bearer channels, and the rest are used for a variety of overhead and signalling functions associated with the bearer channels. When the GL-5 is connected to the host computer resource via a PIM-E card, 30 of the data streams are used as bearer channels, and 1 is used for common control/signalling message traffic.

FIG. 1 recaps how multiplexing takes place in the IOC structure using the GL-0, GL-2 and GL-5 links defined hereinabove.

FIG. 1 depicts examples of station devices that form a part of a typical IOC network. FIG. 1 shows telephone station set 101, terminal device 102, and analog interface module (AIM) 103 coupling facsimile machine 104 to the rest of the IOC. An AIM simply converts the signal from a connected analog device to the aforementioned GL-0 signalling format and bearer channel.

FIG. 1 also shows how GL-0 links 150, 151 and 152, carrying data signals A1, B1 and C1, are multiplexed between stations 101, 102 and 103/104, and SMX 105. These signals (A1, B1 and C1) are also shown multiplexed on GL-2 link 155 between SMX 105 and digital line card (DLC) 106, within LIM 107 (shown in dashed lines). According to the preferred embodiment of the referenced IOC, each LIM contains between 1 and 4 DLCs, where each DLC is the interface between 16 GL-2 links and 2 GL-5 links. For the sake of illustration only, FIG. 1 shows DLC 106 servicing 8 GL-2s and 1 GL-5. The GL-2 in FIG. 1 (link 155) is shown to repeat the multiplexed A1, B1, C1 pattern between SMX 105 and DLC 106.

Also depicted in FIG. 1 is GL-5 link 175 which serves as the interface between LIM 107 and CEM 108. The GL-5 is shown to carry the data from 8 GL-2s (labeled 1-8 and including GL-2 line 155) coupled to DLC 106 in LIM 107. The LIM and CEM are described in detail in the incorporated IOC patent application. The GL-5 link 175 is shown to multiplex signals A1, B1 and C1 (from GL-2 line 155) along with signals AX, BX, CX where X ranges from 2-8 and represents the three station signal sets, on each of the seven other GL-2 links coupled to DLC 106 (e.g., A8, B8 and C8 are from GL-2 link number 8, labeled 190). Thus GL-5 link 175 is shown to carry 24 bearer channels between LIM 107 and CEM 108 as indicated hereinbefore.

It is important to note that the hierarchical structure depicted in FIG. 1 parallels the IDN taught in the referenced patent. SMX 105 is functionally equivalent to a three input station multiplexer (an SMX3) and each DLC 106 in LIM 107 functions (at least in part) as a twenty-four input (8 GL-2s with a 3 station capacity on each GL-2 link) channel multiplexer (a CMX24) as described in the referenced patent.

Since the multiplexing and signalling protocol taught in the referenced IDN patent is suitable for use with the IOC (in the context of the architecture set forth in FIG. 1) and with the present invention, no further discussion of these protocols is necessary herein.

Figure 2:
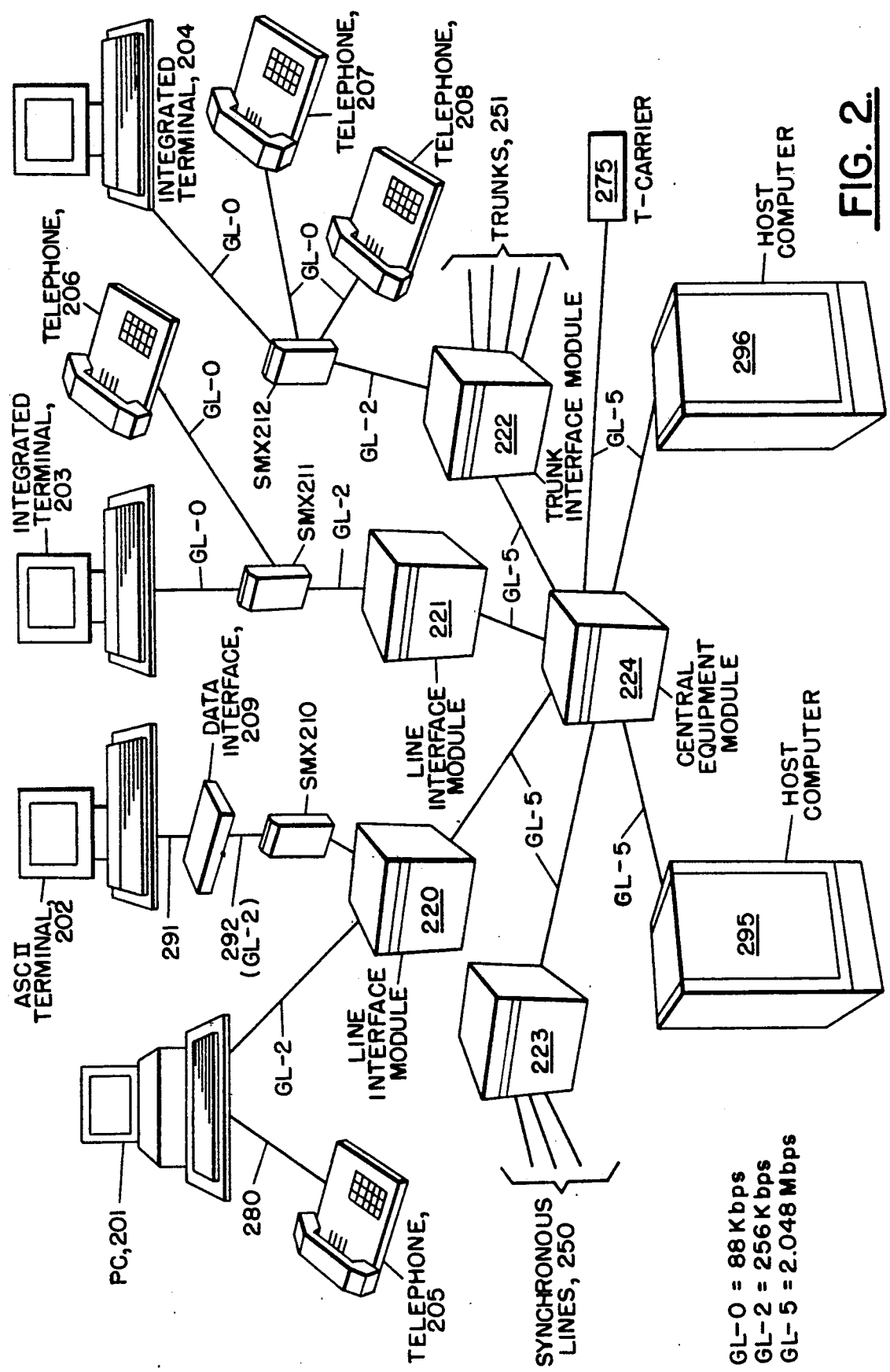
FIG. 2 is a high level representation of a circuit switch based digital communication system in which the present invention is useful.

FIG. 2 depicts a high level representation of the referenced IOC architecture. This is an illustrative context in which the present invention is useful.

Depicted in FIG. 2 are PC station 201; ASCII terminal 202; integrated terminals 203 and 204; and telephone sets 205, 206, 207 and 208, with set 205, coupled to PC 201 via link 280.

Also shown in FIG. 2 are SMX devices 210, 211 and 212 along with data interface 209, which allows terminal 202 to be coupled to the IOC via links 291 and 292. Data interface 209 simply converts RS-232-C signals (e.g. from plotters, modems, ASCII terminals, etc.) into GL-0 format. FIG. 2 also shows two LIMs, LIM 220 and LIM 221, TIM 222, (with trunks 251 coupled thereto), data interface module (DIM) 223 (an interface device, for coupling synchronous links 250 to the IOC) and CEM 224. Also shown coupled to the IOC is t-carrier 275.

FIG. 2 goes on to show an IOC that includes at least one host computer resource. The depicted computers, units 295 and 296, could, for example, be an 88k microprocessor chip set.

The GL-0, GL-2 and GL-5 links used to interconnect the components of the IOC depicted in FIG. 2 are each separately labelled.

It can be seen with reference to FIG. 2 that each SMX (lime SMX 212) services up to three GL-0 links; that in the case of PC 201, a GL-2 link directly services the PC and telephone set 205; that the input to the LIM, DIM and TIM devices (from the station side of the network) is via GL-2 links; and that the interface between CEM 224 and all of the devices to which it may be coupled, occurs on GL-5 links.

Figure 3:
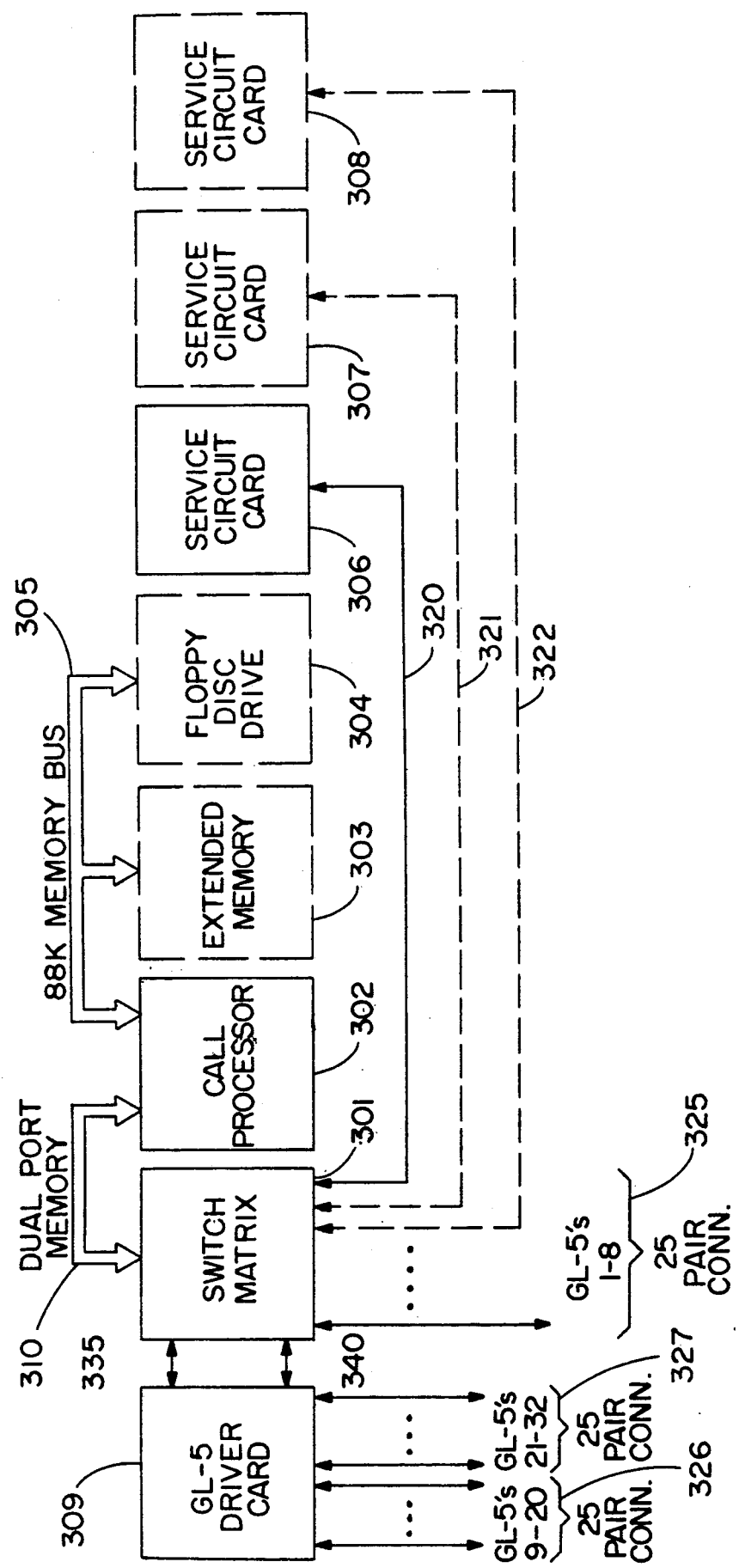
FIG. 3 is a block diagram depicting a suitable central equiptment module (CEM) for use in implementing the present invention.

FIG. 3 depicts the details of an illustrative CEM which can be used to support the present invention. The depicted CEM is comprised of switch matrix 301; call processor 302; extended memory 303 and floppy disk drive 304 (units 303 and 304 being associated with call processor 302 and coupled thereto via memory bus 305); at least one service circuit card, 306, optional service circuit cards 307 and 308; and GL-5 driver card 309. Not shown in FIG. 3, but typically included in the CEM, is a self contained power supply.

According to the preferred embodiment of the IOC described in the referenced copending patent application, switch matrix 301 is a digital time-division switching matrix that provides totally non-blocking switching between up to 32 GL-5 links, each having a 32 cahnnel capacity. Accordingly, the switch can handle up to 1024 channels.

According to the preferred embodiment of the IOC, switch matrix card 301 includes a switch matrix clock and microcomputer that functions primarily as the switch control processor. This microcomputer can also be used to perform user defined processing tasks in a manner that reduces loads typically placed on the call processor. The microcomputer on card 301 can therefore be used to speed up system operation in addition to performing switching per se. It will be seen hereinafter that the switch control processor is used by the present invention for defining, activating and managing SVCs.

Call processor card 302 is shown in FIG. 3 to be separate from the switch matrix card 301 containing the switch control processor and as indicated in the IOC reference, the call processor card can have its own microprocessor and can share memory space with the processor on switch matrix card 301. This is depicted as taking place over dual port memory link 310 in FIG. 3. The shared memory is typically RAM located on either of cards 301 or 302. Those skilled in the art will readily appreciate that switch matrix processor 301, if powerful enough, can handle both the matrix controller and network call processing functions thereby eliminating the need for a separate call processor. Accordingly, the term "switch control processor" as used herein will be defined to include the general processing resources, or switch intelligence, located at the CEM (switch level) including the processors shown on cards 301 and 302 of FIG. 3.

Switch matrix 301 can be used, in the illustrative IOC, to interface 8 external GL-5s that are connected to punch-down blocks via a 25 pair cable. This is depicted in FIG. 3 as the 325 interface. The cable can be connected to the card with a 50-pin connector. These GL-5s can then be distributed to service cards, TIMs, LIMs, and PIM-Es.

To support the interface of more than 8 GL-5s, the IOC allows for the inclusion of an optional GL-5 driver card, shown coupled to card 302 via links 335 and 340, which may be used to interface another 24 GL-5 digital signals, bringing the system total to 32. These data links are connected to the punch-down blocks via two 25-pair cables, shown as 326 and 327 in FIG. 3.

Floppy disk controller card 304, which may be realized by using a small disk drive, may be used to locally store call processing code and an IOC data base. This data base typically carries system configuration information and is loaded at the time the IOC is initialized.

According to the preferred embodiment of the IOC, up to three service cards may be installed in a CEM, and each service card has eight service circuits. These circuits can be configured to provide the appropriate mix of functions like conferencing, DTMF Tone Generation, DTMF Tone Reception, ASCII Character Generation, Link Analysis and asynchronous terminal interfacing. Additionally, one service circuit can be used to support the SVCs broadcast capability in the manner to be described hereinafter.

The function of each circuit card can be varied by down loading defined functions from the data base. This is indicated in FIG. 3 by GL-5 lines 320-322 between service circuit cards 306-308 and call processor 302 (coupled via switch matrix 301). More particularly, a control channel within each of the aforesaid GL-5 lines is used to carry down load information from the data base.

Having described the context in which SVCs may be defined and used, the remainder of the detailed description will focus on SVCs per se.

Figure 4:
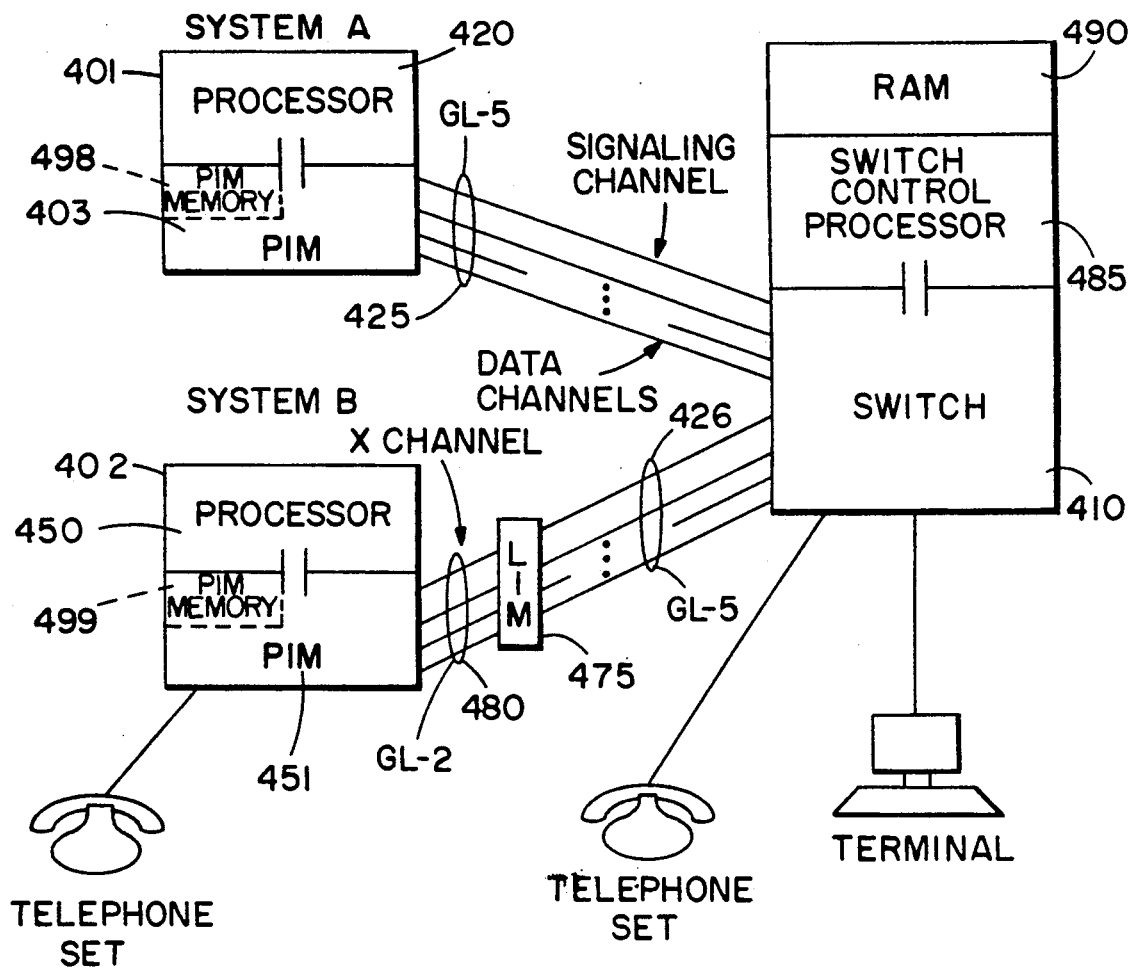
FIG. 4 is a high level block diagram of specific hardware that can be used to establish and activate SVCs.

FIG. 4 depicts a particular configuration of IOC hardware that is useful in illustrating the principals of the invention.

Two systems are shown in FIG. 4, System A (labeled 401) and System B (labeled 402). Each system is shown comprised of a processor and a PIM. For the sake of illustration only, the processor in System A is assumed to be a host computing resource, e.g. an 88k processor, like unit 296 in FIG. 2. This processor, labeled 420 in FIG. 4, is serviced by a PIM-E device, unit 403, which interconnects processor 420 to switch 410 via GL-5 links(s) 425. Link 425 is shown in FIG. 4 to include data channels and a singalling channel.

FIG. 4 also depicts a processor in System B, e.g., an IBM, PC, like unit 201 in FIG. 2. This processor, labeled 450 in FIG. 4, is serviced by a PIM-PC device, unit 451, which interconnects processor 450 to switch 410 via a combination of a GL-5 link (link 426), LIM 475 and GL-2 link 480. This is analogous to the connection of PC 201 in FIG. 2 to CEM 224 via LIM 220, the GL-2 and GL-5 links depicted in FIG. 2 between these devices, and the PIM-PC (not shown in FIG. 2) in station device 201. Other telephone instruments and station equipment are shown coupled to the switch via the dashed links in FIG. 4.

The present invention can be described in terms of the steps necessary to establish an SVC between computer 450 and 420. For the sake of illustration, computer 450 is assumed to be the source device and computer 420 is assumed to be the target device (or data destination).

All communications involving SVCs are by definition simplex connections. If, for example, computer 420 was to act as a source of data destined for computer 450, a separate SVC would need to be established for this connection even if an SVC were defined for connecting computer 450 to computer 420.

The steps to be set forth hereinafter for establishing the SVC from computer 450 to 420 are the same steps that are used to create an SVC between any two station devices in a circuit switch based network. Thus, for example, the SVC methodology to be described with reference to computers 450 and 420 could be used to establish SVCs between any pair of PCs and/or host processors.

It will also become clear that by using SVCs in the context of the IOC, PCs (like computer 450) can use data rates of 64, 128 or 192 kbps; while host computing devices (like computer 420) can use from 64 kbps to 2 mbps of bandwidth. As indicated hereinbefore, both point-to-point and broadcast connections are supported by SVCs and the methods for setting up both of these connection types will be explained in detail hereinafter.

Finally, before detailing these steps, it should be noted with reference to FIG. 4 that the depicted SVC hardware is the same switching and distribution hardware used for voice traffic. According to the preferred embodiment of the invention there is no special central equipment hardware required for the SVC service.

As opposed to FPCs, which are active from the beginning of a call to the end of a call, an SVC switches into existance between two points only when there is data to be transmitted. When there is no data to be transmitted the device which owns an SVC and the switch control processor, shown as unit 485, just remember (i.e., store an indication in memory) that the connection is defined. An SVC is used as a regular data path but it does not use any network resources when it is not carrying data. Although SVCs use the same network hardware as FPCs, SVCs use quicker signalling commands to set up and take down connections. This provides high-speed data multiplexing without requiring data buffering hardware within the network.

If a source computer requests access to a destination which is not immediately available, switch control processor 485 remembers the request. When both source and destination are available, the processor connects the two computers and tells the source computer to start transmitting.

The switch control processor can connect several 64 kbps channels in parallel to provide each SVC with the maximum available data rate. According to the invention, the processor matches the data rates of the two interfaces before activating each connection.

The following description of SVC operation roughly parallels the sequence of events during normal connection operation.

To begin with, the PIMs depicted in FIG. 4 (devices 403 and 451) connect processor 420 and 450 to signalling channels and 64 kbps data bearer channels. The switch control processor, unit 485, controls the activation of PIM data channels which connect processors through the network. Switch control processor 485 is connected to all of the PIMs on the network via signalling channels. Processor 485 has no direct access to the data carried on the 64 kbps bearer channels.

The IOC switch control processor is in constant communication with all of its PIMs via the signalling channels. The signalling channels carry short messages which contain commands, responses, or status information. Signalling channels are time division multiplexed onto the same lines as bearer channels. The illustrative IOC, within which SVCs are being described, has two priorities of signalling channels. Normal priority signalling channels are used to establish connections, control testing, and manage operation parameters, therefore they are known as management signalling channels. High priority channels are used to control activation, deactivation, and real-time channel configuration, these are called access control signalling channels.

It should be recalled that the bearer channels carry data between processors attached to the IOC. These channels operate at a clear channel rate of 64 kbps. A bearer channel may carry any protocol which can be encoded on its bit stream.

SVC communications are designed to use multiple bearer channels in parallel to carry data for a single connection at data rates greater than 64 kbps. Under typical SVC operation, data is carried in 0 bit insertion protocol frames similar to those used for local area networks. SVC assumes that there is an address within the transferred frames which is sufficient to identify the sender and intended receiver of the frame.

Each bearer channel connects a PIM to matrix 410 of the IOC. One bearer channel may be connected to any other bearer channel through the switching matrix. In this fashion a data path may be set up between any two PIMs attached to the network. The switching matrix is under the direct control of processor 485. Processor 485 contains, in its database, information to direct the connection process and provide quickly switched access between computers.

When a network is started or a new PIM is connected, the PIM and switch control processor 485 begin operation by establishing the signalling channels. The PIM controllers communicate with switch control processor 485 via signalling channels. Each PIM controller and switch control processor verify their compatibility and start the protocol which carries the commands and responses for SVC operation. The PIM controller function processes commands and responses, generates signalling messages, and controls buffer management for bearer channel traffic. The PIM controller does not process any of the data carried in the bearer channels.

The switch control processor is completely in control of the initialization process (hereinafter called registration) as well as the configuration and activation processes during SVC operation. The PIM controllers request service from the switch control processor which in turn coordinates service to all of the PIMs which are requesting service at any given time.

When registering, each device communicates its device type, the details of which channel groups (sometimes referred to hereinafter as super channels) are associated with the device (i.e. which channels are valid to make a connection, if available, between specific devices) and communicates its network address to the switch control processor.

Registration information is, according to the preferred embodiment of the invention, stored in RAM 490. Network address and device type information are also maintained in RAM 490.

Channel assignments are maintained, according to the preferred embodiment of the invention, in RAM 490 as well. In the IOC context each PC has one channel group in the transmit direction and one channel group in the receive direction. The channel group in the tranmit direction could for example be all three bearer channels on a GL-2 link. The channel group might for example have fewer than three bearer channels if one of the bearer channels was being used for other purposes such as voice communication. Furthermore, in the IOC context, each device attached to a GL-5 link might have up to thirty groups defined. The channel group information maintained in RAM 490 provides a global indication of valid channels for making specific connections if the specific channels are available for use.

Device status information is also maintained in RAM 490 and typically reflects each device being idle at the time of registration.

Other information is maintained in RAM 490 such as SVC definitions, bid information ("bidding", to be explained hereinafter) and timers (the use of which are also explained hereinafter).

Certain configuration information is also maintained at the PIM controller level so that rapid communication with the switch control processor can be facilitated. For example, information about defining channel groups is typically stored at both the PIM controller level (at, for example, memory 498 and memory 499 shown in FIG. 4 as part of PIM 403 and PIM 451 respectively), and in RAM 490, so that channel group assignments can be processed based on channel group number.

After registration SVC connections need to be defined and activated as required. It should be recalled that an SVC is connection oriented i.e., before data transmission starts the transmitting processor must define a connection with the receiving processor. In order to define the connection the transmitting (or source) processor e.g., processor 450 in FIG. 4, provides the network address of the receiving (or destination) processor, e.g. processor 420 of FIG. 4, to the switch control processor via a management message. The process of defining the destination computer to the switching network controller is referred to herein as connection definition.

A computer may have several connection defined throughout the network at any given time. Each connection has, according to the preferred embodiment of the invention, a unique identification number which the source computer and the IOCs use to refer to the connection. This connection number is the local connection identifier referred to hereinafter as an LCI. According to the preferred embodiment of the invention, the LCI value is set by the PIM controller.

It should be recalled that an SVC is simplex connection. This means that it only carries data from the source to the destination computer. If a duplex path is needed, the destination computer must set up a second SVC to carry data back to the original source computer.

A defined connection may be either active or dormant. A connection becomes active when switch control processor 485 connects channels through matrix 410 between the source (like processor 450) and destination computers (like processor 420). When a connection is dormant there is no path for that connection and no data can pass. During a dormant period, however, switch control processor 485 remembers the connection information and can activate the connection quickly on demand. A source computer asks the switched control processor to activate a particular connection when it has data to be sent.

According to the preferred embodiment of the invention, to activate a pre-defined connection, a PIM controller sends the switched control processor a bid command. A PIM sends a bid when it has data to transmit, therefore it is the source computer of the SVC. To identify the destination computer, the source computer uses an LCI which was previously set as part of connection definition described hereinabove. If the destination computer is ready to receive data, the switched control processor sets up one or more 64 kbps channels through the matrix and notifies the source computer that it may begin transmitting. The switched control processor tells the source computer that it can begin transmitting by sending it a grant command.

If the destination computer is not available, the switch control processor remembers the activation request and activates the connection as soon as bearer channels are available to both the source and destination computers.

As indicated hereinbefore, RAM 490 shown in FIG. 4 contains, according to the preferred embodiment of the invention, a description of LCIs, connection request information, status of bids and grants across the system, etc. When transmission is complete, the source computer notifies the switched control processor that it has ceased transmitting. The switched control processor then deactivates (or drops) the connection, updates the information in RAM 490, and can reallocate the channels which were being used.

Activation and deactivation happen very quickly. Since the access delay is usually imperceptible to humans, several connections can be interleaved to provide, effectively, simultaneous access to several computers. Such access is efficient only if connections do not dominate channels. In order to prevent this potential problem, each PIM must limit its holding time for each activation of an SVC. In order to do this, according to the preferred embodiment of the invention, the PIM starts a timer when it receives a grant command; when the timer lapses, the PIM controller stops accepting new frames for transmission from the source computer. When the last accepted frame is complete, the PIM controller notifies the switch control processor that the channels have been released. The switch control processor is then free to reassign the channels to other connections.

If the PIM controller realizes that there is more data to be sent, it sends a pause command when it stops transmitting. When the switched control processor controller recognizes a pause command, it releases the channels and requeues a bid command for the LCI. Queuing takes place, according to the preferred embodiment of the invention, by recording the bid request in the RAM 490. If the PIM controller knows of no more data for the SVC, it sends a drop command which causes the switch control processor to release the channels without requeing a Bid for the connection.

In addition to the timer located at the PIM level, the preferred embodiment of the invention calls for a faster timer to be located in RAM 490 which the switch control processor can use to time out runaway PIM controllers, to restuff PIM controller timers, etc.

The number of connections which can be active for any source computer at any given time depends upon the type of Processor Interface Module used. A PIM-E can carry several active connections simultaneously while a PIM-PC can have only one connection active at a time. No matter what the type of PIM, several connections may be pending activation for every one that is active.

SVC operation makes efficient use of all available 64 kbps channels via a process called dynamic channel configuration. This process allows the switch control processor to "scavenge" bandwidth, which is unused by voice or terminal data traffic, for SVCs. This technique provides the largest possible data rate at any given time.

Channel configurations are set by the switch control processor as it responds to activation requests. The switch control processor notifies each PIM about channel configurations before activating a connection. If a configuration change is required while a connection is active, the switch control processor deactivates the connection and reactivates it with the new configuration.

Each type of PIM has a different number of time slots in a major frame. A PIM-E has sixty time slots while a PIM-PC has only three time slots. These time slots are allocated for use by connections according to a configuration map which is, according to the preferred embodiment of the invention, a bit map stored in RAM 490. A PIM-E may have several configuration maps concurrently active while a PIM-PC can have only one configuration map which is active at any one time. The switch control processor sets the configuration map(s) for each PIM.

As indicated hereinbefore SVCs can be used to implement broadcast operations in a digital circuit switch environment. By utilizing the case of broadcast feature, one PIM may communicate with several other PIMs through a broadcast service circuit located in the CEM. Each PIM controller has one broadcast connection and several standard connections.

If a device wants to transmit in a broadcast mode to all other devices in the network, the device PIM, according to the preferred embodiment of the invention bids for a broadcast channel by sending a predefined unique ID to the switch control processor.

The unique ID is routed by the switch control processor (e.g., like processor 301 of FIG. 3) to a feature card (e.g., a service circuit card like any of cards 306-308 in FIG. 3) which may be used to buffer data coming over bearer channel(s) from the transmitting device. Further, according to the preferred embodiment of the invention, the feature card is then used to transmit buffered broadcast data to station devices coupled to both GL-2 and GL-5 links. PIM-PC type devices received data over the aforementioned X channel. Devices coupled to GL-5 links are provided with broadcast data on a predefined bearer channel. Utilizing this mechanism, data can be broadcast to all stations shown in FIG. 2 that terminate on a GL-2 or GL-5 link.

The above described use of SVCs for broadcast in the IOC context is not meant to limit the scope or spirit of the invention. It can be readily appreciated by those skilled in the art that all stations on the network (including those attached to GL-0 links) could receive broadcast data by using SVCs and using available bearer channels or X channels to deliver broadcast data to any station.

It will be also be readily appreciated by those skilled in the art that SVCs can be used for voice connections as well as for carrying data in an integrated digital circuit switch like the IOC. Such use would, for example, facilitate such applications as rapid action voice broadcasting.

What has been described are methods and apparatus for implementing SVCs in a digital circuit switch like the IOC, IDN, etc. Various hardware and/or software combinations can be devised by those skilled in the art to realize the preferred SVC bid/grant scheme set forth hereinbefore. However, for the sake of completeness, SVC operations will be described hereinafter in terms of state machine models which can be utilized by those skilled in the art to design system dependent hardware and/or software to implement the invention.

The SVC state models to be set forth hereinafter describe SVC operation in terms of the state of an individual connection as perceived from within the switch control processor. For the purposes of describing the SVC protocol this perspective will enable those skilled in the art to make and use the invention.

According to the preferred embodiment of the invention, the switch control processor is comprised of a Source Controller and a Destination Controller for each PIM which is attached to the switch control processor. Each Source Controller is comprised of a Connection Manager (CM) and an Access Controller (AC).

The Destination Controller has only a Connection Manager. There is one state model for the connection in each portion of the Source Controller and the connection in each portion of the Source Controller and Destination Controller, however the SVC protocol can principally be described in terms of activity within the Source Controller with reference to the state of the Destination Controller for the other PIM.

This protocol to be described is concerned only with the operation of individual SVCs and therefore does not address initiation and activation of the Source and Destination Controllers within the communication system.

The state tables in FIGS. 5-14 are written with one table for each state. The leftmost column contains a list of the incoming events. These events are either requests or responses from PIMs or they are timers expiring within the switch control processor. The Process column contains a description of the processing of the event within the switch control processor. The Output Event column lists the resulting messages to PIMs or internal system events. The rightmost column contains the new state number which the connection enters after processing and event generation.

The state model of a source controller will be described first.

A Source Controller is the subsystem within the switch control processor which manages all connections for a particular PIM. Until the Source Controller is initialized and in the In-Service state (to be described with reference to FIG. 6), no connections may be established. If a Source Controller is reset from the In-Service state, the state information for all connections for that PIM, according to one embodiment of the invention, is lost. If a Source Controller is set into a Maintenance state, all connections are maintained, however, they cannot carry traffic other than diagnostic commands and data.

There are two controller interfaces in the Source Controller and each is involved in the transfer of data. The Source Controller interface is very interactive with the PIM, however once the interface is operational, there is very little signalling traffic that concerns the Destination Controller.

In state 1, defined hereinafter as the "Initialized" state, only the basic PIM data structures are defined. No content has been assigned and no interaction with the PIM can occur. A Source Controller passes through this state as it comes into service and returns to this state when required to by the main switch control processor for purposes of major reconfiguration or "warm-boot". In this state, the switch control processor is "unaware" of the existence of a PIM. According to the preferred embodiment of the invention, the Source Controller exits this state to an IN-SERVICE state via an interaction with the switch control processor that begins when the PIM sends an unsolicited device type code identification message. These events are summarized in FIG. 5.

State 2 is defined as the "IN-SERVICE" state. All data transfer connection operations and state changes occur in this state. As each PIM registers with the controller, the data structures to contain the status are established. When registration is complete, the Source Controller enters the IN-SERVICE state. Each connection state machine described hereinafter operates while the Source Controller is in the IN-SERVICE state. The set of possible input events, processing and output events in the IN-SERVICE state are summarized in FIG. 6.

The MAINTENANCE state is depicted in FIG. 7. This state assures the static environment which is required by hardware oriented diagnostic and test procedures. During maintenance no connection may carry data or change state, thus when the Source Controller enters the MAINTENANCE state, activities within the IN-SERVICE state are "frozen". When the Source Controller enters the MAINTENANCE state, all connections are deactivated but remain established. If the Source Controller goes to the INITIALIZED state from the MAINTENANCE state, all connections are released.

The Source Controller Connection Manager States are depicted in FIGS. 8-11. The source side of connection operation is modeled separately from the destination side so that the implementation of the two sides is indepenent. This independence is practical, since the two sides do not operate in a synchronized fashion. Independent state models also provides for implementation in separate nodes of a wide area switching network.

The Connection Manager states are defined on a per connection basis. Each state describes the status of a connection at a point in time and is independent of the status of other connections.

In the initial or FREE state, each virtual connection is nothing more than a potential connection, (i.e. a legal local connection identifier (LCI) value with associated source and destination address and connection state information). Once the virtual connection, which is identified by the LCI, is established, it may activate, deactivate, hold, etc. based upon event messages passed over the signalling channels. For purposes of the state model, no distinction is made between the SVC management channel and the Access Control channel. There is also no distinctive state for each possible configuration of the bearer channels. The states of the connections are independent from the states of the super channels which they utilize. The CM and AC function in the switch control processor coordinate the use of super channels without requiring assistance from a PIM.

FIG. 8 depicts state 1 for the Source Controller Connection Manager, "The Connection Is Unused (FREE) State". At this point in time, the connection has not been assigned. The assignment can only initiate from the source PIM, therefore the only acceptable event in a Connection Definition Request (CON_REQ).

FIG. 9 depicts state 2 for the Source Controller Connection Manager, the "Connection Ready and Idle (IDLE) State". In this state the connection is reserved, waiting for a Bid command (BID) from the source PIM. The only other acceptable event is a command to release the connection (REL_REQ).

FIG. 10 depicts state 3 for the Source Controller Connection Manager, the "Bid Pending (BID_PENDING)" state. In this state, a Bid message has been received from a PIM, requesting an activation for this connection. The request is in a queue waiting for free bearer channels at either the source and/or destination. The connection will remain in the bid pending state until a compatible configuration of channels is found. Configuration matching is performed by the switch control processor using the data in the RAM 490 tables.

Once a configuration match is made for a pending connection, the channels are switched through the matrix. The Bid pending state is usually terminated by sending a Grant message to the source PIM, however it may also be terminated in response to a command to Drop or abort the Bid. The connection then enters the ACTIVE state (state 4).

FIG. 11 depicts state 4 for the Source Controller Connection Manager, the "Connection Active (ACTIVE)" state. A virtual connection is "defined" as the result of a connection definition action, however, it cannot do any useful work until it is activated. A connection is activated by the switch control processor when it sends a GRANT message to the source PIM. For devices directly coupled to a GL-5 link the GRANT message carries a source super channel number to tell the PIM which channels to use. A device terminating on a GL-2 link (like a PIM-PC) has only one super channel, so therefore, according to the preferred embodiment of the invention, its GRANT command carries only the LCI.

Once a connection is activated, the only legitimate event messages the PIM can send are PAUSE or DROP. Pause causes the switch control processor to disconnect the super channels and enter a Bid event on its internal bid queue. Drop causes the switch control processor to disconnect the super channels without any provision to reactivate the connection.

While a connection is in the active state, the switch control processor can only send two messages to control connection activity: YIELD and T_RESET.

The IOC controller can send configuration control messages at any time after the PIM is initialized. The only time that these messages effect the operation of a connection is when the connection is active. If a source channel configuration or bit rate message is sent for the source super channel which is in use by an active connection, the PIM yields the connection and the switch control processor requeues it. After the PIM confirms the configuration and/or bit rate, the switch control processor grants a connection using the new configuration.

The Source Controller Access Controller States will now be described with reference to FIGS. 12-14. Again, the source side of the channel configuration is modeled separately from the destination side so that the implementation of the two sides is independent.

The state models for the Source and Destination Access Controllers are identical except for the names of the commands, therefore, both models can be defined with reference to FIGS. 12 and 13.

The Access Controller (AC) states are defined on a per super channel basis. Each state describes the status of a super channel at a point in time and is independent of the status of other super channels.

By definition, super channels always have a configuration. When the AC is initialized all of the super channels are in a configuration confirmed state (state 1) with no channels assigned. As the groups are configured, each goes through a configuration pending state (state 2) then returns to the configuration confirmed state with some channels assigned. Channels are released from a group by the same steps, resulting in a new list in the confirmed group. The "Super Channel Configuration Confirmed" State and the "Super Channel Configuration Confirmed" State and the "Super Channel Configuration Pending" State are illustrated in FIGS. 12 and 13.

Finally, to conclude the state machine description of the SVC, a "Channel Configuration Resource Pending" state (state 3 for the Source Controller AC) is depicted in FIG. 14. Depending upon where the AC reset command originates, the AC may see one or two reset messages from a PIM. Because of the design of the state machine, one of these resets may be superfluous, however, it should only be redundant and leave the AC in a configuration confirmed state for all groups with no channels assigned in any group.

Since each frame carries sufficient address information to identify its connection, there is no need for the Destination Controller to inform the PIM of the connection responsible for any frames that are received. The destination receiver stands ready to receive a frame at any time on any super channel. Eliminating this unnecessary information provides for more efficient interface operation. It also means that there is no destination CM state model; the AC model defines all of the destination controller operation.

What has been described are methods and apparatus for implementing switched virtual connections (SVCs) in a digital communications switching system meeting all of the objectives set forth hereinbefore. Those skilled in the art will recognize that the foregoing description of the novel methods and apparatus has been presented for the purposes of illustration and description only. It is not intended to be exhaustive or to limit the invention to the precise form disclosed, and obviously many modifications and variations are possible in light of the above teaching.

The embodiment and examples set forth herein were presented in order to best explain the principles of the instant invention and its practical application to thereby enable others skilled in the art to best utilize the instant invention in various embodiments and with various modifications as are suited to the particular use contemplated.

What is claimed is:

1. Apparatus for making switched virtual connections in a digital communication system utilizing the same control and distribution equipment used for voice and data communications in said system, comprising:
    (a) a central equipment module, including a circuit switch and a switch control processor, for controlling the definition and activation of switched virtual connections;
    (b) a plurality of station devices each of which is connected to said circuit switch and said switch control processor, wherein each station device is capable of transmitting bearer channel information to and through said circuit switch under the control of said switch control processor and further wherein each station device is capable of communicating signal channel information with said switch control processor over at least one signal channel;
    (c) transmission means for coupling said bearer channel information from each of said plurality of station devices to said circuit switch and for coupling said signal channel information between said plurality of station devices and said switch control processor;
    (d) first memory means, coupled to said switch control processor, for storing at least system configuration information, current switched virtual connection definitions, a list of station device Bid requests and global channel group configuration information;
    (e) second memory means, associated with each of said plurality of station devices, for storing at least the station device address, the channel group configuration information for each station, and a list of local connection identifiers for use in naming defined switched virtual connections;
    (f) means for registering a station device with said switch control processor;
    (g) means, responsive to requests from said station devices, for defining switched virtual connections for a given device under control of said switch control processor;
    (h) means for activating switched virtual connections upon request from a station device, under control of said switch control processor, based on the real time availability of connection resources; and
    (i) timer means, associated with each of said station devices, for controlling the amount of time a given station can utilize a switched virtual connection.

2. Apparatus as set forth in claim 1 further comprising means for dynamically reconfiguring switched virtual connections.

3. Apparatus as set forth in claim 1 wherein said central equipment module further comprises broadcast service circuit means for buffering data broadcasted from a given station device to a plurality of station devices when utilizing switched virtual connections in a broadcast mode.

4. Apparatus for making switched virtual connections in a circuit switched based digital communication system, comprising:
    (a) means for defining switched virtual connections between a plurality of station devices of said system;
    (b) switch control means for selectively actuating one or more of said virtual connections only in response to a different predetermined signal corresponding to each of said virtual connections;
    (c) first memory means operatively associated with said switch control means for storing information relative to each of said virtual connections; and
    (d) second memory means operatively associated with said plurality of station devices for storing at least channel group information, said virtual connections remaining dormant until actuated by said switch control means.

5. Apparatus as set forth in claim 4 wherein said means for defining said switched virtual connections further comprises means for registering each of said station devices with said switch control means.

6. Apparatus as set forth in claim 5 wherein said means for registering each of said station devices communicates to said switch control means which channels in said digital communication system are associated with each of said station devices.

7. Apparatus as set forth in claim 4 further comprising timer means associated with each of said station devices for controlling the time that each of said switched virtual connections is actuated.

8. Apparatus as set forth in claim 7 wherein said switch control means are operatively associated with said timer means for actuating one of said switched virtual connections after another of said switched virtual connections is deactuated.

9. Apparatus as set forth in claim 4 wherein said switch control means further comprises means for dynamically reconfiguring said switched virtual connections.

10. Apparatus as set forth in claim 9 wherein said means for dynamically reconfiguring said switched virtual connections further comprises means for deactuating an active connection and subsequently actuating a different connection.

11. Apparatus as set forth in claim 4 further comprising means for providing a signal from each of said station devices to said switch control means for deactuating a connection between said station devices after transmissions from said station devices are completed.

12. Apparatus as set forth in claim 4 further comprising means for transmitting an access signal between said station devices and said switch control means for actuating a predetermined switched virtual connection corresponding to said access signal.

13. Apparatus as set forth in claim 12 wherein said switch control means further comprises means for storing said access signal when said predetermined switched virtual connection is unavailable at the time said access signal is transmitted.

14. Apparatus as set forth in claim 9 wherein said means for dynamically reconfiguring said switched virtual connections further comprises means for locating and utilizing bandwith initially assigned to a deactuated one of said switched virtual connections, for assignment to another of said switched virtual connections to enable said other switched virtual connection to be actuated.

15. Apparatus as set forth in claim 14 wherein said switch control means further comprises means for monitoring bandwith of said switched virtual connections that are actuated.

16. A method of making switched virtual connections in a digital communications system, comprising the steps of:
  (a) defining a plurality of switched virtual connections between a plurality of station devices included in said system;
  (b) storing information relative to each of said switched virtual connections;
  (c) storing information relative to each of said station devices;
  (d) selectively actuating one or more of said plurality of switched virtual connections, utilizing switch control means, only in response to a different predetermined signal corresponding to each of said switched virtual connections, each of said switched virtual connections remaining dormant until actuated by said switch control means; and
  (e) registering each of said station devices with said switch control means.

17. A method of making switched virtual connections in a digital communications system, comprising the steps of:
  (a) defining a plurality of switched virtual connections between a plurality of station devices included in said system;
  (b) storing information relative to each of said switched virtual connections;
  (c) storing information relative to each of said station devices;
  (d) selectively actuating one or more of said plurality of switched virtual connections, utilizing switch control means, only in response to a different predetermined signal corresponding to each of said switched virtual connections, each of said switched virtual connections remaining dormant until actuated by said switch control means; and
  (e) controlling the maximum time period during which any of said virtual connections is actuated.

18. A method of making switched virtual connections in a digital communications system, comprising the steps of:
  (a) defining a plurality of switched virtual connections between a plurality of station devices included in said system;
  (b) storing information relative to each of said switched virtual connections;
  (c) storing information relative to each of said station devices;
  (d) selectively actuating one or more of said plurality of switched virtual connections, utilizing switch control means, only in response to a different predetermined signal corresponding to each of said switched virtual connections, each of said switched virtual connections remaining dormant until actuated by said switch control means; and
  (e) dynamically reconfiguring said switched virtual connections.

19. A method as set forth in claim 18 wherein said step of dynamically reconfiguring said switched virtual connections further comprises the steps of:
  (a) locating bandwidth initially assigned to a deactuated one of said switched virtual connections, for use by another of said switched virtual connections; and
  (b) utilizing located bandwidth for actuating said other of said switched virtual connections.

* * * * *